US006000322A

United States Patent [19]
To

[11] Patent Number: 6,000,322
[45] Date of Patent: Dec. 14, 1999

[54] TRANSFER PRESS DIE SUPPORT

[75] Inventor: Thuy M. To, Palos Hills, Ill.

[73] Assignee: Verson, Chicago, Ill.

[21] Appl. No.: 09/016,016

[22] Filed: Jan. 30, 1998

[51] Int. Cl.[6] ................................ B30B 15/02; B23Q 3/55

[52] U.S. Cl. ................................ 100/35; 72/448; 100/224; 100/918; 483/28

[58] Field of Search ................................ 100/35, 221, 224, 100/229 R, 918; 72/446, 448; 483/28

[56] References Cited

U.S. PATENT DOCUMENTS

| | | | |
|---|---|---|---|
| 2,996,025 | 8/1961 | Georgeff | 100/224 |
| 3,738,284 | 6/1973 | Atsuta et al. | 100/918 |
| 4,408,950 | 10/1983 | Lasky | 100/224 |
| 4,417,511 | 11/1983 | Ikeoka | 100/918 |
| 4,433,620 | 2/1984 | Kiyosawa | 100/224 |
| 5,040,403 | 8/1991 | Henderson et al. . | |
| 5,076,092 | 12/1991 | Henderson et al. | 100/224 |
| 5,113,684 | 5/1992 | Oster | 100/918 |
| 5,186,037 | 2/1993 | Bihler . | |
| 5,271,261 | 12/1993 | Bihler et al. . | |
| 5,277,687 | 1/1994 | Shimoichi et al. . | |
| 5,337,594 | 8/1994 | Pettersson et al. . | |
| 5,551,275 | 9/1996 | Hofele et al. . | |
| 5,582,063 | 12/1996 | Hofele et al. . | |
| 5,595,111 | 1/1997 | Michael et al. . | |
| 5,755,653 | 5/1998 | Nishida | 100/918 |

FOREIGN PATENT DOCUMENTS

| | | | |
|---|---|---|---|
| 3344670 | 6/1984 | Germany | 100/918 |
| 46-18715 | 5/1971 | Japan | 100/918 |
| 59-191599 | 10/1984 | Japan | 100/918 |
| 1445917 | 12/1988 | U.S.S.R. | 100/224 |

*Primary Examiner*—Stephen F. Gerrity
*Attorney, Agent, or Firm*—Baker & Botts, L.L.P.

[57] ABSTRACT

The invention comprises an apparatus for supporting one or more dies used in a transfer press. In one aspect of the invention, the press die support structure comprises a gull wing shaped press bed comprising a top portion including two opposing wing portions, at least a part of each wing portion being supportable by one of a pair of approximately parallel horizontal beams, the top portion operable to support at least one press die, and a bottom portion having a center portion disposed between the wing portions.

In another aspect of the invention, the press die support structure comprises a bolster assembly operable to carry a first set of dies and to facilitate exchanging the first set of dies with a second set of dies, the bolster assembly comprising a plurality of adjacent support members releasably coupled to one another each operable to carry a respective die, a plurality of wheels disposed inwardly from at least one of the support members, and a drive mechanism coupled to at least one, but not all of the wheels, the drive mechanism operable to drive the wheel coupled thereto to facilitate exchanging the first set of dies with a second set of dies.

12 Claims, 9 Drawing Sheets

TRANSFER PRESS DIE SUPPORT

CROSS-REFERENCE TO RELATED APPLICATIONS

This application is related to U.S. application Ser. No. 016,755, filed on Jan. 30, 1998, by Thuy M. To, et al. and entitled "Bridge Press," pending.

This application is related to U.S. application Ser. No. 016,718, filed on Jan. 30, 1998, by Allen J. VanderZee, et al. and entitled "Bridge Frame for a Transfer Press, " pending.

These applications have been commonly assigned to Verson, a Division of Allied Corporation.

TECHNICAL FIELD OF THE INVENTION

The present invention relates to the field of transfer press technology and more particularly to a method and apparatus for supporting dies in a transfer press.

BACKGROUND OF THE INVENTION

In many industries, such as automotive manufacturing, components are formed using a transfer press. At a basic level, a transfer press comprises a press bed supporting one or more lower dies; a slide carrying one or more upper dies corresponding to the lower dies; and a crown for raising and lowering the slide relative to the press bed. Components are formed by positioning materials between the upper and lower dies and lowering the slide to press the material between the upper and lower dies, thus modifying the material between the dies according to the configuration of the dies. After the initial press, the component is transferred to an adjacent set of dies, and the process is repeated to further modify the component. This process is repeated at until the component has been modified as desired.

Transfer presses are typically large, often over fifty feet tall. To accommodate these machines within reasonably sized manufacturing facilities, the transfer presses are generally assembled and operated in a pit extending below the floor level of the facility. Manufacturers of these presses often assemble the presses within similar pits at their own facilities to allow customers to view the press before purchasing it. The total time necessary to assemble the press is determined, in large measure, by the 'pit time,' corresponding to the assembly occurring within the pit. Assembling components within the pit generally takes much longer than assembling at floor level because only one level of components may be assembled at a time.

Often, it is desirable to use a single elongated bolster to carry the plurality of lower dies associated with the work stations within the press. These bolsters are generally supported by wheels at either end, which facilitate moving the bolster in and out of the press frame to exchange sets of dies. Each set of wheels is typically driven by one or more drive mechanisms. A problem with this approach is that the single elongated bolster is often too heavy to assemble outside of the pit in which the press operates. Assembly thus requires considerable pit time, which greatly increases the total assembly time of the press. Another problem with this approach is that the large bolsters are often difficult and expensive to transport.

Still another problem with this approach is that the wheels supporting the bolster are often placed at either end of the elongated structure. This allows excess deflection of the bolster during operation of the press. In addition, because the wheels supporting the bolster typically reside at either end, long drive mechanisms, or multiple drive mechanisms are typically used to drive the wheels to move the bolster. This results in extra weight and expense.

SUMMARY OF THE INVENTION

In accordance with the present invention, a press die support comprises a gull wing shaped press bed comprising a top portion including two opposing wing portions, at least a part of each wing portion being supportable by one of a pair of approximately parallel horizontal beams, the top portion operable to support at least one press die, and a bottom portion having a center portion disposed between the wing portions.

In another aspect of the invention, the press die support comprises a bolster assembly operable to carry a first set of dies and to facilitate exchanging the first set of dies with a second set of dies, the bolster assembly comprising a plurality of adjacent support members releasably coupled to one another each operable to carry a respective die, a plurality of wheels disposed inwardly from at least one of the support members, and a drive mechanism coupled to at least one, but not all of the wheels, the drive mechanism operable to drive the wheel coupled thereto to facilitate exchanging the first set of dies with a second set of dies.

Technical advantages of the present invention include the provision of a press die support for use with a transfer press having a bridge frame. The gull wing shape of the press bed is particularly advantageous for use with a bridge press supported, in part, by a pair of approximately horizontal beams. The gull wing shape facilitates disposing the center portion of the bed between the pair of horizontal support beams. Placing the center portion of the press bed between the support beams provides for an overall reduction in height of the press, while maintaining adequate press bed height to ensure proper load bearing characteristics.

Utilizing a plurality of releasably coupled adjacent bolsters provides a structure capable of servicing multiple work stations, while maintaining manageability of the individual components during shipping and assembly. By coupling adjacent bolsters to one another, the entire bolster assembly can be moved without requiring connection of a wheel driving mechanism to the wheels of each bolster. This provides an advantage of reducing the hardware necessary to move the adjacent bolsters in and out of the bridge press exchange lower dies.

The present invention provides a structure that reduces, or eliminates problems associated with deflection of elongated single-piece bolsters. In addition, the present invention facilitates partial assembly of the bolster assembly and accompanying structures at a floor level, prior to putting the beds and first pair of horizontal beams into the pit. This saves valuable pit time, thereby reducing the device's total assembly time. In addition, using a plurality of smaller adjacent bolsters, eliminates problems associated with shipping large components that may exceed weight restrictions.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF THE INVENTION

Figure 1A:
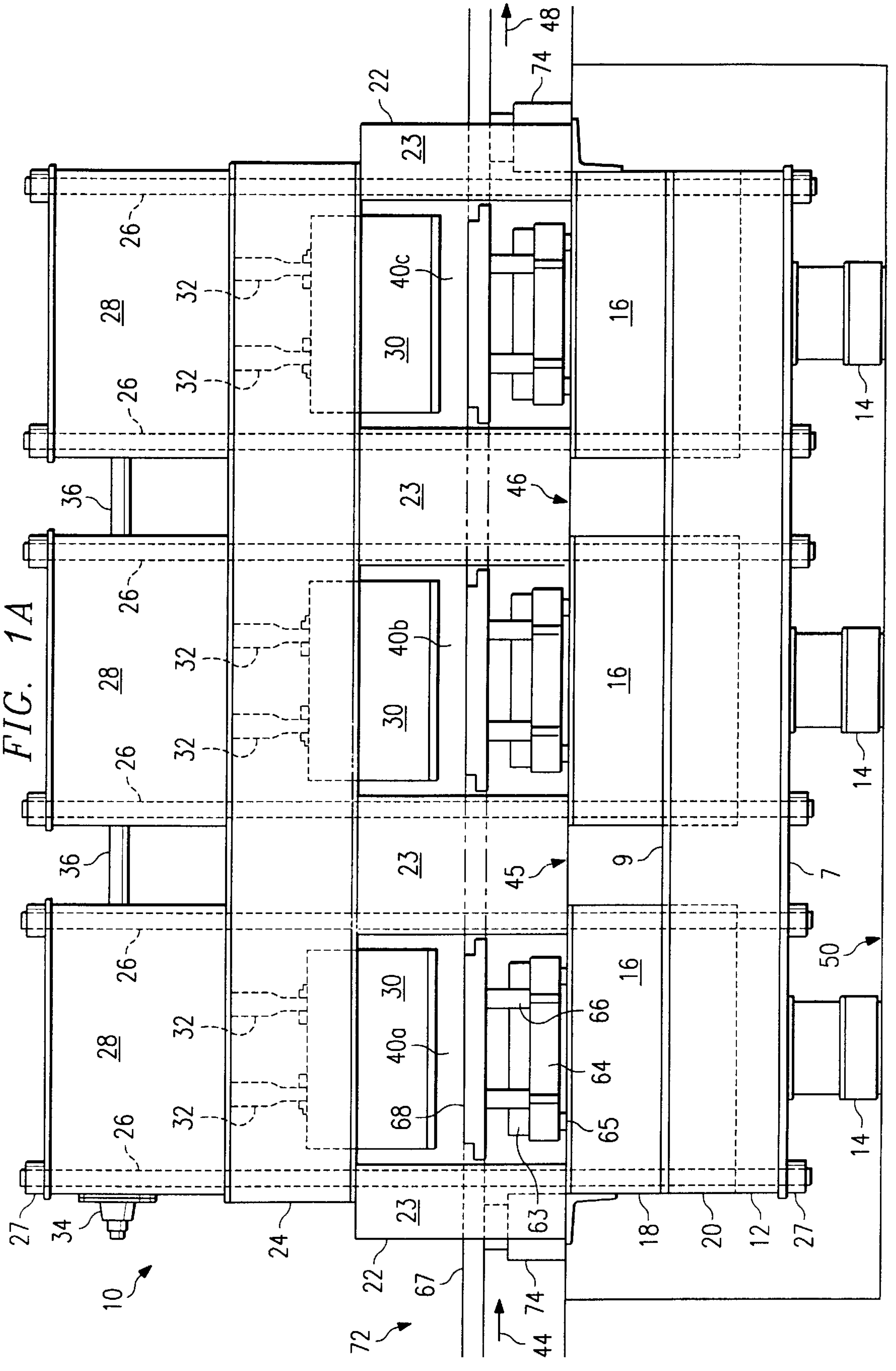
FIG. 1*a* is a front view of a bridge press constructed according to the teachings of the present invention.
Figure 1B:
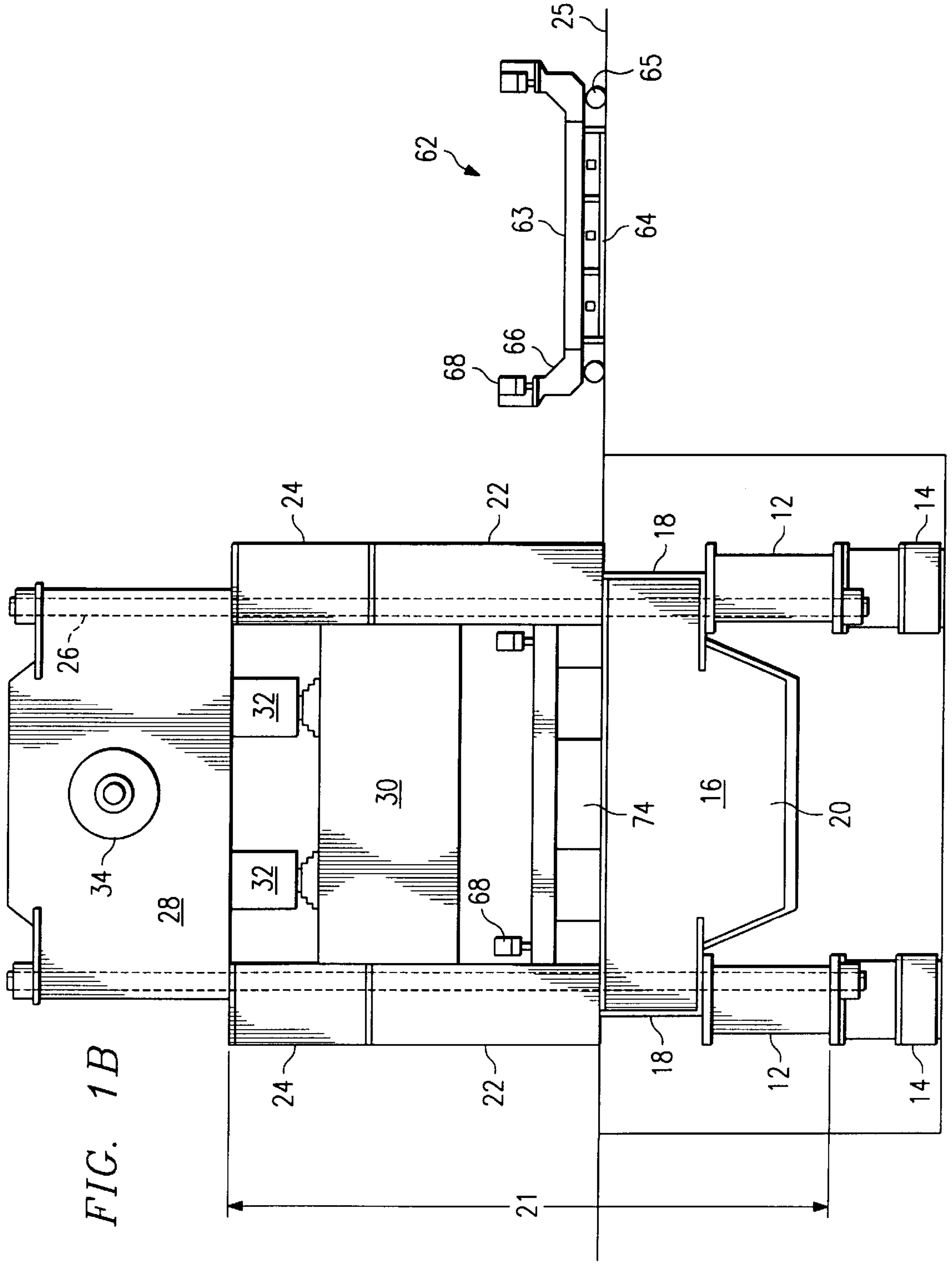
FIG. 1*b* is a left-hand view of the bridge press shown in FIG. 1*a;*

FIGS. 1*a*–1*b* illustrate front, left-hand, and top views, respectively, of a bridge press 10 constructed in accordance with the teachings of the present invention. Bridge press 10 comprises a first plurality of horizontal beams, referred to generally as horizontal beams 12. In the illustrated embodiment, first plurality of horizontal beams 12 comprise a pair of horizontal support beams disposed approximately parallel to one another. First pair of horizontal beams 12 form a lower bridge of bridge frame 15.

Each support beam of first pair of horizontal beams 12 may comprise, for example, a beam being approximately eight feet high, three feet wide, and fifty-five feet long. Throughout this document, the "height" of horizontal beams refers to a measurement taken from a bottom side 7 of the beam to a top side 9. Each beam may be formed, for example, from steel plate sections having various thicknesses depending on the load bearing requirements of that section. For example, thicker steel plate may be used near the center of beams 12 to control deflection of the beam. Component dimensions specified throughout this document are intended for illustrative purposes only, and may vary depending on the specific characteristics and functions of the given bridge press. Other components having different dimensions may be used without departing from the scope of the invention. In addition, another number of horizontal support beams may be used without departing form the scope of the invention.

Bridge press 10 may also include a plurality of footings 14 disposed beneath and supporting first pair of horizontal beams 12. In the illustrated embodiment, footings 14 comprise isolators operable to isolate bridge press 10 from vibrations and to minimize forces exerted by bridge press 10 on surface 50. Footings 14 may comprise, for example, isolators available from Vibrodynamic. Surface 50 may comprise, for example, the bottom of a pit within which bridge press 10 operates.

Figure 2A:
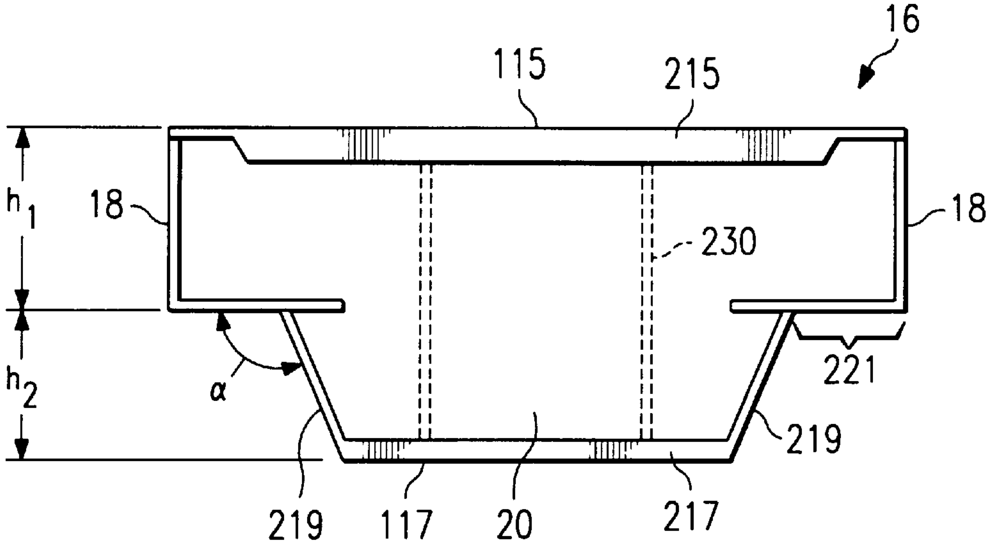
FIG. 2*a* is a left-hand view of a press bed constructed according to the teachings of the present invention.
Figure 2B:
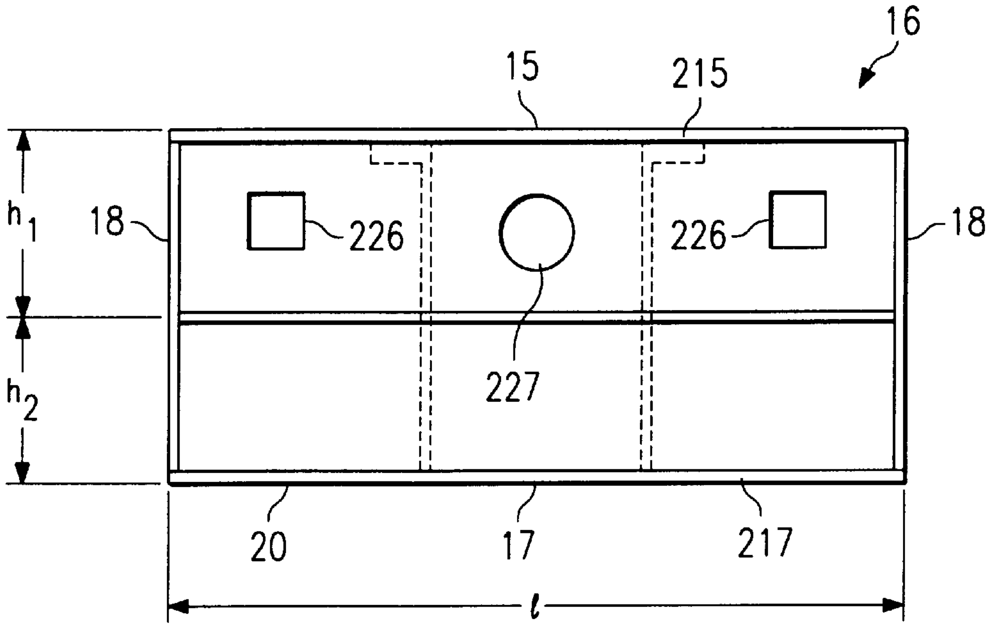
FIG. 2*b* is a front view of a press bed constructed according to the teachings of the present invention.

Bridge press 10 further comprises a plurality of press beds 16 supported, at least in part, by first pair of horizontal beams 12. FIGS. 2*a* and 2*b* are left-hand and front views, respectively of press bed 16. In the illustrated embodiment, each press bed 16 comprises a top surface 15 and a bottom surface 17. Bottom surface 17 comprises a gull-wing shape having a center portion 20 disposed between two opposing wing portions 18. Wing portions 18 of press beds 16 are supported by first pair of horizontal beams 12. Center portions 20 of press beds 16 are disposed between first pair of horizontal beams 12.

Angled members 219 couple center portion 20 to wing portions 18. Wing portions 18 and angle portions 219 form between them a wing angle $\alpha$. Wing angle $\alpha$ may advantageously be chosen to be between 90 and 180 degrees. In the illustrated embodiment, wing angle $\alpha$ measures approximately 120 degrees. By designing wing angle $\alpha$ between 90 and 180 degrees, the areas of contact 221 between wing portions 18 and first pair of horizontal beams 12 are maximized, while the height $h_2$ of center portion 20 is increased.

Maximizing the area of contact between wing portions 18 and first pair of horizontal beams 12 is desirable to assure stability of press bed 16 and minimize deflection due to forces during operation. Increasing the height h2 of center portion 20 provides an advantage of increasing the load bearing strength of press bed 16 by using otherwise wasted space between first pair of horizontal beams 12. In this embodiment, height $h_2$ of center portion 20 is approximately 54.0 inches, giving a total bed height of approximately 120.0 inches. The particular dimensions of each press bed 16 may vary according to the specific application.

Press bed 16 may be formed, for example, by welding or otherwise connecting sections of steel plate. The thickness of the plate used for each section depends on the forces ultimately placed on that section. For example, top plate 215 may comprise a 7.50 inch plate, and bottom plate 217 may comprise a 2.50 inch plate, while sidewall sections comprise 1.50 inch plates. Customizing the thickness of each section provides an advantage of ensuring adequate material strength, without wasting material and adding excess weight to the structure.

Internal support members 230 and 240 may reside within bridge press 16 to provide additional structural support. Internal support members 230 and 240 may comprise, for example, sections of 3.00 inch steel plate. In addition, apertures 226 and 227 may be formed in the sidewalls of press bed 16 to allow access to interior portions of press bed 16 during manufacturing, assembly, and maintenance.

Referring again to FIGS. 1*a*–1*b,* top surfaces 15 of press beds 16, either directly, or indirectly through another component, support the lower dies (not explicitly shown) used in forming work pieces. In the illustrated embodiment, top surfaces 15 of press beds 16 support bolsters 62, which carry the lower dies. Each bolster 62 includes a support member 63 for supporting and holding the lower die, a drive mechanism 64 disposed beneath support member 63, and wheels 65 affixed beneath support member 63. The number and position of wheels 65 may be selected to optimize stability and minimize deflection of bolster 62. Feed rail support structures 66 may be coupled to bolster 62 to provide support to feed rail sections 68. Feed rail sections 68 comprise portions of a feed rail structure 72, which transports work pieces through bridge press 10.

The transport system of the illustrated embodiment includes feed rail structure 72 and feed modules 44. Feed modules 44 operate to manipulate feed rail structure 72 to pick up work pieces from one location and drop them off at another location. The illustrated embodiment provides only one example of a system for transporting work pieces through bridge press 10. Any transport system may be implemented without departing from the scope of the invention.

Bridge press 10 also includes a second plurality of horizontal beams 24 disposed outwardly from first pair of horizontal beams 12 and press beds 16. In this embodiment, second plurality of horizontal beams 24 comprises a pair of horizontal beams, which are parallel to and in approximate alignment with first pair of horizontal beams 12. Second pair of horizontal beams 24 comprise an upper bridge 23 of bridge frame 15. Second pair of horizontal beams 24 may comprise structures similar to first pair of horizontal beams 12. Second pair of horizontal beams 24 need not, however, be identical to first pair of horizontal beams 12, and indeed may vary considerably given the comparably lower load bearing requirement of second pair of horizontal beams 24.

Second pair of horizontal beams 24 are supported by a plurality of vertical support structures 22 disposed between first pair of horizontal beams 12 and second pair of horizontal beams 24. In the illustrated embodiment, support structures 22 include vertical support columns 23 having a rectangular configuration. Vertical support columns 23 may, alternatively, comprise another configuration without departing from the scope of the invention. For example, vertical support columns 23 may comprise cylindrical or square configurations. Utilizing vertical support columns 23 having a rectangular configuration is advantageous in providing adequate work space between first pair of horizontal beams 12 and second pair of horizontal beams 24, while also providing ample work space between support structures 22.

Vertical support columns 23 reside between first pair of horizontal beams 12 and second pair of horizontal beams 24. Vertical support columns 23 provide load bearing support for second pair of horizontal beams 24. In the illustrated embodiment, vertical support columns 23 rest, at least in part, on top sides 15 of press beds 16. In an alternative embodiment (not explicitly shown), vertical support columns 23 may reside directly on first pair of horizontal beams 12. In that case, press beds 16 reside between, rather than beneath vertical support columns 23. Any combination of these embodiments may also be used without departing from the scope of the invention. For example, some vertical support columns 23 may rest directly on press beds 16, while others reside between press beds 16 and rest directly on first pair of horizontal beams 12. The illustrated embodiment provides an advantage of utilizing the weight of the components disposed outwardly, or above press beds 16 to secure and maintain the location of press beds 16. In addition, this embodiment provides an advantage of allowing for use of shorter support columns, which minimizes the total weight of bridge press 10.

Bridge press 10 further comprises a plurality of crowns 28 disposed outwardly from second pair of horizontal beams 24. Each crown 28 is coupled to a slide 30, which is disposed between crown 28 and press bed 16. Crown 28 and slide 30 are connected through coupling members 32. Slide 30 may comprise a solid steel structure formed, for example, through a casting process. The dimensions and weight of slide 30 may be selected to provide sufficient force to perform a particular modification to the work piece. In the illustrated embodiment, each crown 28 supports a separate slide 30. Alternatively, multiple crowns may support a single slide 30. Details of such an embodiment, and advantages thereof will be described later in this document.

Crowns 28 provide a mechanism for moving slides 30 vertically with respect to press beds 16. Each crown 28 may utilize, for example, a mechanical or a hydraulic drive mechanism to effect vertical movement of slide 30 relative to its respective press bed 16. In the illustrated embodiment, crowns 28 implement a mechanical drive mechanism 34, and more particularly, a link drive. Other drive mechanisms, such as an eccentric drive could be utilized without departing from the scope of the invention. In the illustrated embodiment, each crown 28 is coupled to another crown 28 with a drive link 36. The functions of crown 28, drive 34, and drive links 36 will be further described later in this document with reference to the operation of bridge press 10.

Bridge press 10 includes tie rods 26 extending from the top of crowns 28 through the bottom of first pair of horizontal beams 12. Each tie rod 26 extends through one of vertical support columns 23 along its vertical axis. Each vertical support column 23 comprises a cavity (not explicitly shown) extending along its vertical axis through which tie rods 26 may extend. In one embodiment, the combination of vertical support columns 23 and tie rods 26 comprises vertical support structure 22. In that case, vertical support columns 23 provide load bearing support, while tie rods 26 assist in laterally stabilizing bridge press 10.

First pair of horizontal beams 12, second pair of horizontal beams 24, and crowns 28 include cavities (not explicitly shown) through which tie rods 26 may extend. In the illustrated embodiment, press beds 16 also comprise such cavities (not explicitly shown). In this embodiment, cavities in first pair of horizontal beams 12, press beds 16, vertical support columns 22, second pair of horizontal beams 24, and crowns 28 are aligned to allow tie rods 26 to extend continuously through all of these components, providing additional lateral support for bridge press 10. Fasteners 27 connect to each end of tie rods 26 to maintain the position of tie rods 26.

In another embodiment (not explicitly shown), where vertical support columns 23 reside on first pair of horizontal beams 12 and between press beds 16, tie rods 26 do not extend through press beds 16. Instead, tie rods 26 extend through cavities in first pair of horizontal beams 12, vertical support columns 23, second pair of horizontal beams 24, and crowns 28. In that case, press beds 16 may be affixed to first pair or horizontal beams 12 through a separate set of tie rods or other coupling mechanisms (not explicitly shown).

First plurality of horizontal beams 12, vertical support structures 22, and second plurality of horizontal beams 24 comprise a bridge frame 21 for bridge press 10. Bridge frame 21 provides a structure for accommodating various combinations of press beds 16, crowns 28, and slides 30. By facilitating a modular press design, bridge frame 21 provides significant advantages such as accelerated device assembly time and added flexibility in shipping the device to customers.

In general operation, bridge press 10 acts to press, bend, cut and/or otherwise manipulate raw materials to form completed or partially competed work pieces. Each slide 30 carries at least one upper die (not explicitly shown), and each press bed 16 supports at least one bolster 62 carrying a lower die (not explicitly shown). Bridge press 10 forms work pieces by positioning raw materials between the upper and lower dies, lowering slide 30 to exert force on the dies, and performing a particular manipulation on the work piece according to the configuration of the dies.

In the illustrated embodiment, each slide 30 services a single work station 40. As will be described in detail later in this document, a single slide may service several work stations. The function performed at each work station depends on the configuration of the dies associated with slide 30 and press bed 16, the weight of slide 30, and the presence or absence of various other optional components, which may affect the level and/or direction of the force exerted on the work piece. For example, pneumatic cushions (not explicitly shown) may, or may not reside beneath press beds 16 to absorb some of the force exerted by slide 30, or to allow complex die motions for deeper drawing operations in forming the work piece.

In forming a work piece, lower dies may be secured to bolsters 62 at floor level 25. Bolsters 62 may then be wheeled into position under slides 30, which carry the upper dies. Feed rails 72, or other suitable automated moving system, may transport raw materials or partially completed work pieces, referred to generally as work pieces, into bridge press 10 at entry side 44. The work piece is first conveyed to work station 40*a,* where an initial draw may be performed. Once the work piece is located between the upper and lower dies, crown 28 lowers slide 30 to bring the upper and lower dies together, thus modifying the material between them. Crown 28 then lifts slide 30 allowing feed rails 72 to remove the modified work piece from between the dies and transport it to the next work station.

The areas between workstations 40 comprise idle stations 45 and 46. Idle stations 45 and 46 provide an opportunity to reorient the work piece prior to its entering the next work station. The work piece continues through bridge press 10, being modified at each work station 40 until it reaches exit side 48. At exit side 48, the work piece may be completed, or may be re-passed through bridge press 10 for further modification using different dies. Bridge press 10 may utilize more than one set of bolsters 62, so that while one set of bolsters is in use in bridge press 10, the other set can be loaded with a different die. Because loading dies can take considerable time, using more than one set of bolsters provides significant time-savings.

Figure 3A:
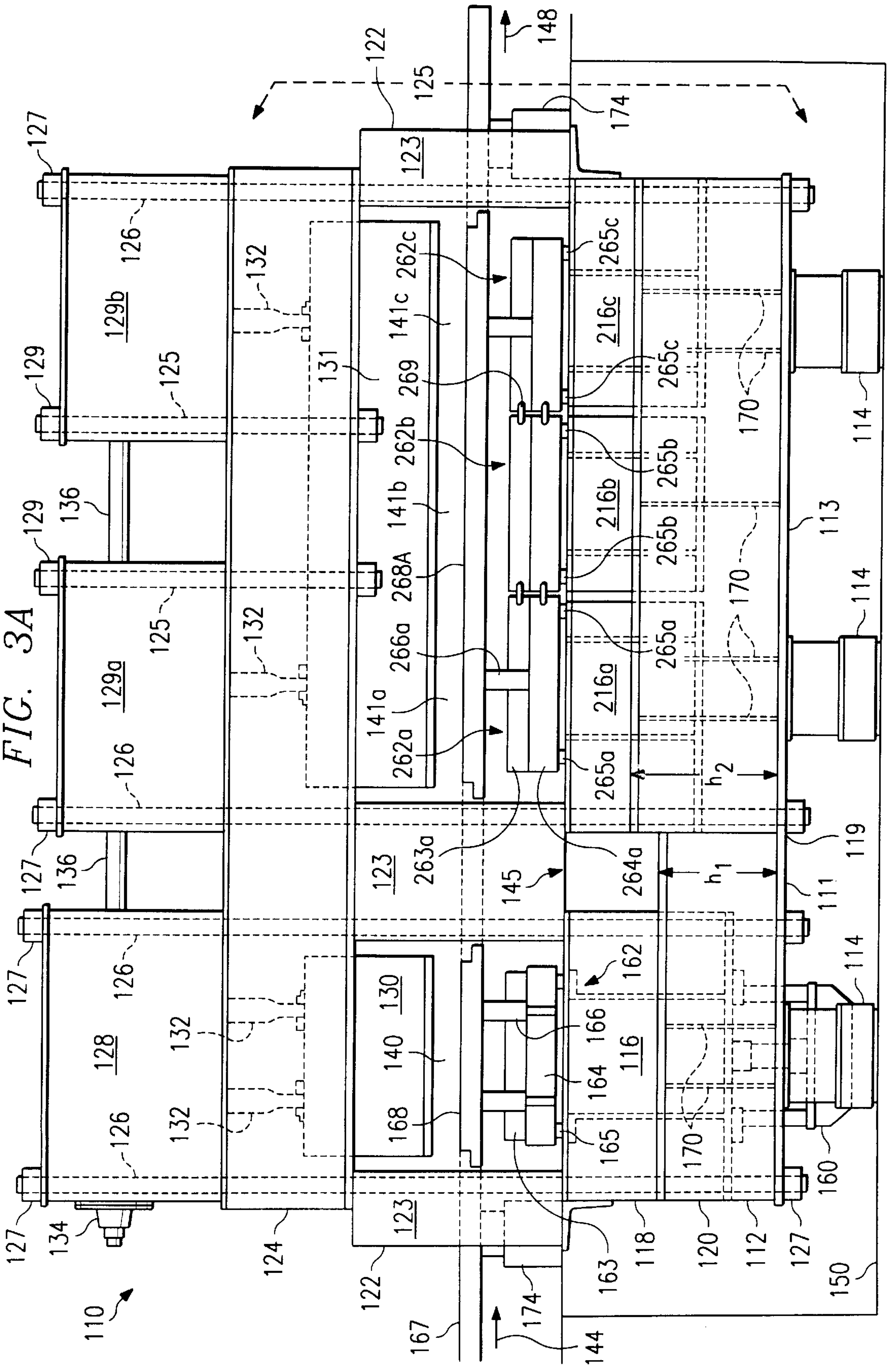
FIG. 3*a* is a front view of another embodiment of a bridge press constructed according to the teachings of the present invention.
Figure 3B:
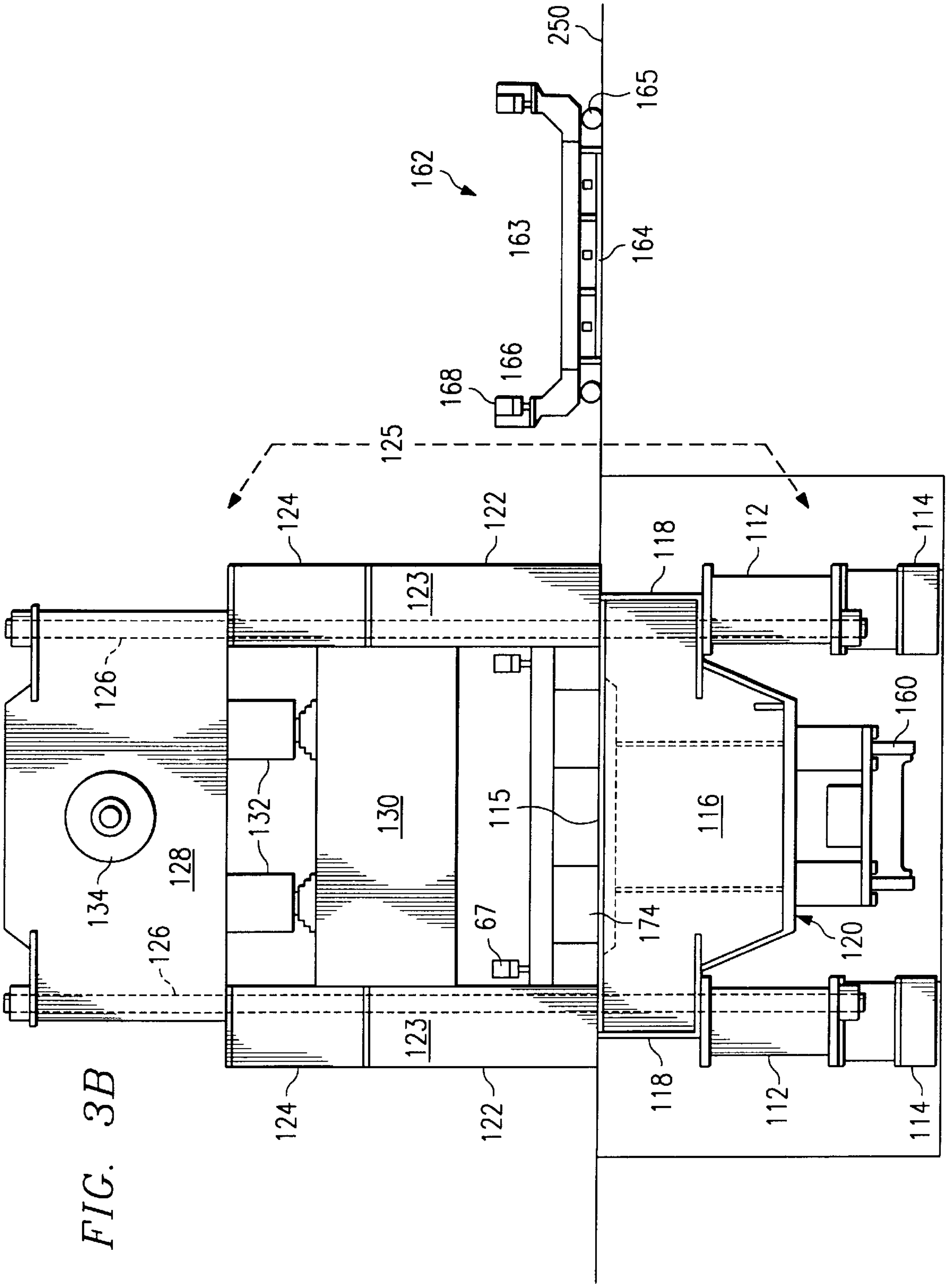
FIG. 3*b* is a left-hand view of the bridge press shown in FIG. 3*a;*
Figure 3C:
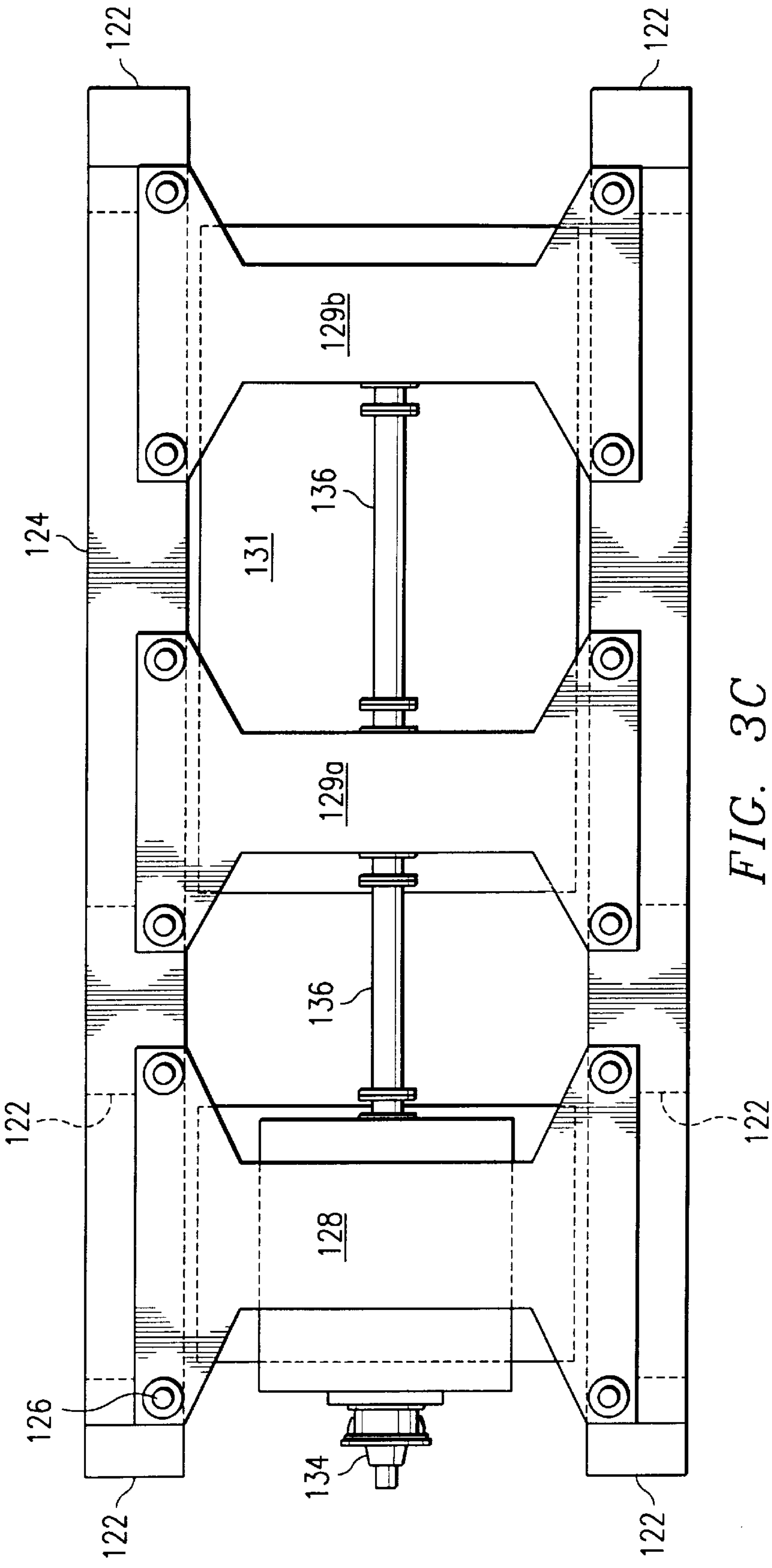
FIG. 3*c* is a top view of the bridge press shown in FIG. 3*a;*

FIGS. 3*a*–3*c* are front, left-hand, and top views, respectively, of another embodiment of a bridge press 110 constructed according to the teachings of the present invention. Like bridge press 10 shown in FIGS. 1*a*–1*b,* bridge press 110 comprises a bridge frame 115, which includes a lower bridge comprising a first plurality of horizontal beams 112, vertical support structures 122 disposed outwardly from first plurality of horizontal beams 112, and an upper bridge comprising a second plurality of horizontal beams 124 disposed outwardly from and supported by vertical support structures 122. A plurality of footings 114 support bridge frame 115 from beneath. Footings 114 may comprise isolators operable to isolate bridge press 110 from vibrations and to minimize forces exerted by bridge press 110 on surface 150. Surface 150 may comprise the bottom surface of a pit in which bridge press 110 operates.

In the embodiment shown in FIGS. 3*a*–3*c,* vertical support structures 122 comprise vertical support columns 123 having a rectangular configuration. In addition, vertical support structures 122 may comprise tie rods 126, each of which extends through a vertical support column 123 along its vertical axis. In this embodiment, first plurality of horizontal beams 112 comprises a pair of horizontal beams disposed approximately parallel to one another. Likewise, in the illustrated embodiment, second plurality of horizontal beams 124 comprises a pair of horizontal beams disposed approximately parallel to one another, and approximately parallel to first pair of horizontal beams 112.

First pair of horizontal beams 112 may comprise beams formed from steel plate sections. The plate sections used to form each beam may comprise different thicknesses to provide various degrees of support at different locations along the lower bridge. For example, in the illustrated embodiment, lower plates 121 comprise 4.5 inch plate sections in areas supporting work station 140 and idle station 123, and 7.25 inch plate sections in areas supporting work stations 141*a*–141*c.* To provide additional support, each beam 112 may further include internal support members 170 approximately aligned with center portions 120 of each press bed 116 and 216*a*–216*c.*

First pair of horizontal beams 112 may comprise a plurality of portions, or sub-beams, each having a different height depending on the load-bearing requirements of that sub-beam. In the illustrated embodiment, first pair of horizontal beams 112 comprises a first portion 111 having a first height $h_1$, and a second portion 113 having a second height $h_2$. For example, first height $h_1$ may be 78.25 inches, and second height $h_2$ may be 100.25 inches. In this case, the height $h_2$ of second portion 113 is greater than the height $h_1$ of first portion 111, because second portion 113 is required to support a greater load than first portion 111. First pair of horizontal beams 112 may comprise any number of sub-beams depending on the application in which they are implemented. Where sub-beams are used, first portion 111 and second portion 113 of horizontal beams 112 may comprise separate beams, or may be subparts of a single beam. Where first portion 111 and second portion 113 comprise separate structures, they may be joined at seam 119 using any suitable method of affixing the ends of the beams, such as welding. Utilizing sub-beams to support first work station 140 and subsequent work stations 141*a*–141*c* provides an advantage of minimizing the weight of beams 12, while providing adequate load bearing support for each work station.

In the illustrated embodiment, second pair of horizontal beams 124 comprises a pair of uniform height beams. The top plates of second pair of horizontal beams comprise 3.75 inch plate for the portion supporting work station 140, and 4.75 inch plate for the portion supporting work stations 141*a*–141*c.* The bottom plates of second pair of horizontal beams 124 comprise 4.25 inch plate for the portion supporting work station 140, and 4.5 inch plate for the portion supporting work stations 141*a*–141*c.*

Bridge press 110 further comprises a plurality of press beds 116 and 216*a*–216*c.* Press beds 116 and 216*a*–216*c* are supported, at least in part, by bridge frame 125, and specifically by the lower bridge comprising first pair of horizontal beams 212. In the illustrated embodiment, vertical support columns 123 rest on top side 115 of press beds 116 and 216*a*–216*c.* As previously described, vertical support columns 123 may reside directly on first pair of horizontal beams 12 and between press beds 116. The rest of this discussion assumes that vertical support columns are disposed on press beds 116 and 216*a*–216*c.* It should be noted that various alterations and substitutions could be made to the following description to accommodate a design having vertical support columns residing between press beds 116 and 216*a*–216*c.*

Press beds 116 and 216*a*–216*c* are similar in structure and function to press beds 16 described with reference to FIGS. 1*a*–1*c* and FIG. 2. Like press beds 16, each press bed 116 and 216*a*–216*c* comprises a top surface 115 and a bottom surface 117. Each bottom surface 117 comprises a gull-wing shape having a center portion 120 disposed between two wing portions 118. Wing portions 118 of press beds 116 and 216*a*–216*c* are supported, at least in part, by first pair of horizontal beams 112. Center portions 120 of press beds 116 and 216*a*–216*c* are disposed between first pair of horizontal beams 112.

Top surfaces 115 of press beds 116 and 216*a*–216*c,* either directly, or indirectly through another component, support the lower dies (not explicitly shown) used in forming work pieces. In the illustrated embodiment, top surfaces 115 of press beds 116 and 216*a*–216*c* support bolsters 162 and 262*a*–262*c*, respectively. Bolsters 162 and 262*a*–262*c* carry the lower dies. Details of the structure and function of bolsters 162 and 262*a*–262*c* will be explained below.

The particular dimensions of press beds 116 and 216*a*–216*c* may vary according to the specific application. For example, in the illustrated embodiment, press bed 116 supports a work station 140*a* where an initial draw is conducted. This initial draw requires substantial force. Press bed 116 must be capable of withstanding this force and is sized accordingly. Press beds 216*a*–216*c* support work stations 141*a*–141*c*, respectively. In the illustrated embodiment, work stations 141*a*–141*c* support cutting, trimming, and bending steps in the fabrication process. These steps require less force than the initial draw performed at work station 140. Because the forces exerted at work stations 141*a*–141*c* are smaller, press beds 216*a*–216*c* may, accordingly, be designed with smaller dimensions.

In the illustrated embodiment, press beds 216*a*–216*c* comprise individual press beds disposed adjacent to one another. Throughout this document, the term adjacent refers to an approximately side-by-side relationship. Components said to be adjacent may, but need not contact one another. Some amount of space may exist between the components. In this embodiment, each press bed 216*a*–216*c* is independently coupled to first pair of horizontal beams 112, leaving some amount of space between the beds. In another embodiment (not explicitly shown), individual press beds 216*a*–216*c* may be joined at adjacent ends using appropriate fasteners. Each press bed 216*a*–216*c* supports a work station 141*a*–141*c*, respectively. Implementing a plurality of smaller press beds, rather than one large press bed, provides an advantage of simplifying assembly and shipping. The number and location of press beds 116 and 216*a*–216*c* may vary depending on the work pieces being fabricated.

Depending on the particular modification being performed by bridge press 110, various optional components may be utilized to aid in the fabrication process. For example, press bed 116 may be supported in part by a cushion 160. In the illustrated embodiment, cushion 160 comprises a 400-ton pneumatic cushion. Any device operable to customize the amount of force exerted on the work piece may be utilized without departing from the scope of the invention. For example, cushion 160 may comprise a hydraulic or a mechanical cushioning device.

Pneumatic cushion 160 supports press bed 116 at central portion 120. Pneumatic cushion 160 acts to dissipate some of the force exerted on the work piece at work station 140 to ensure that adequate force is applied to the work piece without damaging it. Customization of the force applied to the work piece through cushion 160 facilitates complex die motions for deeper drawing operations in forming the work piece. Customizing the force applied to each work piece through selection of cushion 160 also allows designers to vary the effective force exerted on work pieces without altering the primary components of bridge press 110. This allows manufacturers to fabricate various different work pieces using the same basic bridge press. Although not explicitly shown in FIGS. 3*a*–3*c*, additional cushions could also support press beds 216*a*–216*c*.

Bolsters 162 and 262*a*–262*c* carry the lower dies (not explicitly shown) and may be positioned to reside between press beds 116 and 262*a*–262*c* and slides 130 and 131, respectively. Bolster 162 is similar in structure and function to bolster 62 shown in FIGS. 1*a*–1*b*. Bolsters 262*a*–262*c*, however, provide a unique construction that is particularly advantageous for use in a modular bridge press design. Each bolster 262*a*–262*c*, referred to generally as bolster 262, includes a support member 263 for supporting the lower die and wheels 265 affixed beneath support member 263. The number and position of wheels 265 may be selected to optimize stability and minimize deflection of bolster 262. In the illustrated embodiment, bolsters 262 include 12 wheels 265, six on each side of bolster 262. This provides an effective weight distribution to avoid excessive deflection of bolster 262 while bridge press 110 operates.

Bolster 262*b* includes a drive mechanism 264*b* for driving wheels 265*b*. Wheels 265*a* and 265*c* are not coupled to a drive mechanism, and operate freely. Because bolsters 262*a* and 262*b* are coupled to bolster 262*b*, bolsters 262*a* and 262*c* can be moved using only the power of drive wheels 265*b*. This provides an advantage of reducing the hardware necessary to move bolsters 262*a*–262*c* in and out of bridge press 110 to change lower dies. For example, a relatively short drive shaft may be used to drive center wheels 265*b*, rather than using long shafts or additional drive mechanisms to drive outer wheels 262*a* and 262*c*. Bolsters 262*a*–262*c* are releasably coupled at adjacent ends by removable fasteners 269. Implementing a releasable coupling mechanism provides an advantage of eliminating wheel driving mechanisms from bolsters 262*a* and 262*c*, thus saving weight and expense. Additionally, the smaller individual bolsters are manageable in shipping and assembly.

Each bolster 162 and 262*a*–262*c* includes a feed rail support 166 and 266*a*–266*c*, respectively. Feed rail support structures provide support to feed rail sections 168 and 268. Feed rail sections 168 and 268 comprise portions of feed rail structure 172, which transports work pieces through bridge press 10. The feed rail transport system of FIGS. 3*a*–3*c* is similar in structure and function to that shown in FIGS. 1*a*–1*b*. Again, the illustrated embodiment provides only one example of a system for transporting work pieces through bridge press 110. Any transport system may be implemented without departing from the scope of the invention.

Like bridge press 10 shown in FIGS. 1*a*–1*b*, bridge press 110 comprises a plurality of crowns 128 and 129*a*–129*b* disposed outwardly from second pair of horizontal beams 124. Crown 128 is coupled to a slide 130 via coupling members 132. Slide 130, which resides between crown 128 and press bed 116, is similar in structure and function to slide 30 of bridge press 10. Crown 128 provides a mechanism for raising and lowering slide 130 with respect to press bed 116. The specific mechanism utilized by crown 128 may be mechanical, hydraulic or a combination of the two. In the illustrated embodiment, bridge press 110 implements a link drive mechanism 134. Drive links 136 couple crowns 129*a*–129*b* to crown 128. Drive links 136, which are coupled to primary drive mechanism 134 of crown 128, translate the mechanical functions of primary drive 134 to crowns 129*a*–129*b*, thus enabling crowns 129*a*–129*b* to raise and lower slide 131 relative to press beds 216*a*–216*c*.

Tie rods 125 and fasteners 133 secure crowns 129*a*–129*b* are secured to second plurality of horizontal beams. Crowns 129*a*–129*b* are coupled to slide 131 via coupling members 132. Bridge press 110 provides an advantage of facilitating a flexible modular design. In the illustrated embodiment, two crowns 129*a*–129*b* drive a single slide 131, which services three work stations 141*a*–141*c* supported by three press beds 215*a*–216*c*, respectively. This modularity facilitates using a single slide 131 to service multiple work stations 141*a*–141*c*, while providing manageable sized components promoting ease in assembly and shipping. Bridge frame 115 may support a variety of combinations of crowns, slides, and press beds. This flexibility allows users to perform various fabrication processes by changing components of bridge press 110, while using the same basic bridge frame 115.

Tie rods 126 extend from the top of crowns 128 and 129*a*–129*b* through the bottom of first pair of horizontal beams 112. Tie rods 126 assist in providing lateral stability to bridge press 110, while maintaining alignment of associated components. Each tie rod 26 extends through one of vertical support columns 123 along its vertical axis. As previously described with reference to bridge press 10, vertical support columns 123, horizontal beams 112 and 124, and crowns 128 and 129*a*–129*b* comprise cavities (not explicitly shown) which may be aligned to accept tie rods 126. Tie rods 126 may, or may not extend through press beds 116 and 216*a*–216*c,* depending on whether vertical support columns 123 rest directly on first pair of horizontal beams 112, or on press beds 116 and 216*a*–216*c*. Fasteners 127 connect to each end of tie rods 126 to maintain their position.

Bridge press 110 operates similarly to bridge press 10 described with reference to FIGS. 1*a*–1*b*. Slide 130 carries an upper die (not explicitly shown), which matches a lower die (not explicitly shown) carried by bolster 162 on press bed 116. Similarly, slide 131 carries upper dies (not explicitly shown) which match lower dies carried by bolsters 262*a*–262*c* residing on press beds 216*a*–216*c,* respectively. Bridge press 110 forms work pieces by positioning raw materials between the upper and lower dies, lowering slides 130 and 131 to exert force on the dies, and, depending on the configuration of the dies, performing a particular manipulation on the work piece.

In forming a work piece, lower dies may be secured to bolsters 162 and 262*a*–262*c* at floor level 250. Bolsters 162 and 262*a*–262*c* may then be wheeled into position under slides 130 and 131, respectively. Feed rails 172, or other suitable automated moving system, may transport raw materials or partially completed work pieces, referred to generally as work pieces, into bridge press 110 at entry side 144. The work piece is first conveyed to work station 140*a,* where an initial draw may be performed. Once the raw material is located between the upper and lower dies, crown 128 lowers slide 130 to bring the upper and lower dies together, thus modifying the material between them. Crown 128 then lifts slide 130 allowing feed rails 72 to remove the modified work piece from between the dies and transport it to the next work station. In the illustrated example, slide 130 comprises a 1,750 ton slide. Crown 128, which drives slide 130, comprises a 1,750 ton capacity crown. The size of slide 130 and capacity of crown 128 may be customized to perform particular manipulations to the incoming raw materials.

The area between work stations 140 and 141*a* comprises an idle station 145. Idle station 145 provides an opportunity to reorient the work piece prior to its entering work station 141*a*. As the work piece enters work station 141*a,* feed rails 172 may place the work piece between the upper and lower dies carried by slide 131 and bolster 262*a,* respectively. Crowns 129*a*–129*b* lower slide 131 to bring the upper and lower dies together and perform a desired modification to the work piece. The modification made to the work piece at work station 141*a* may be, for example, cutting, trimming, or bending the partially completed work piece.

In the illustrated embodiment, crowns 128 and 129*a*–129*b* operate to synchronously raise and lower slides 130 and 131. In this manner, bridge press 110 may continuously receive raw materials at work station 140 to begin fabrication of a new work piece. Feed rail system 172 transports each work piece from one work station to the next, until all desired steps have been performed. After the work piece has been modified at work station 141*c,* feed rail system 172 removes the modified work piece from bridge press 110 through exit side 148. At exit side 148, the modified work piece may be completed, or may again be passed through bridge press 110 for further modification using different dies. Bridge press 110 may use more than one set of bolsters 162 and 262*a*–262*c,* so that while one set of bolsters in use in bridge press 110, the second set can be loaded with a different die.

Slide 131 services multiple work stations 141*a*–141*c*. In the illustrated embodiment, slide 131 comprises a 2,000 ton slide. Crowns 129*a*–129*b,* which drive slide 131, each comprise a crown capable of driving at least 1,000 tons. Single slide 131 need not service all work stations 141*a*–141*c*. In another embodiment (not explicitly shown), each work station 141*a*–141*c* could be serviced by a separate slide. Similarly, bridge press 110 may comprise any number of crowns 129 to drive corresponding slides 131. This modularity provides significant advantages in allowing for flexibility of design and ease of assembly and shipping bridge press 110.

Figure 4C:
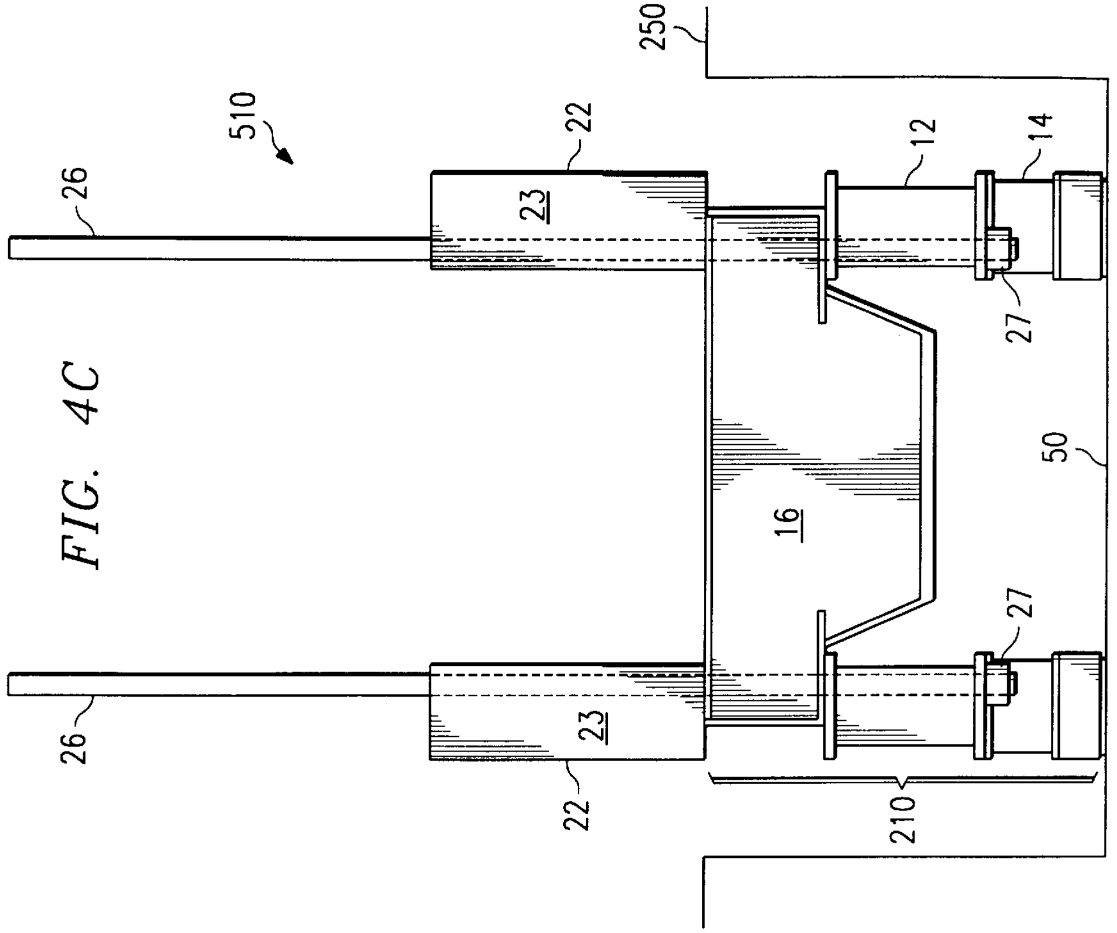
FIGS. 4*a*–4*d* are left-hand views of partially constructed portions of a bridge press constructed according to the teachings of the present invention.
Figure 4A:
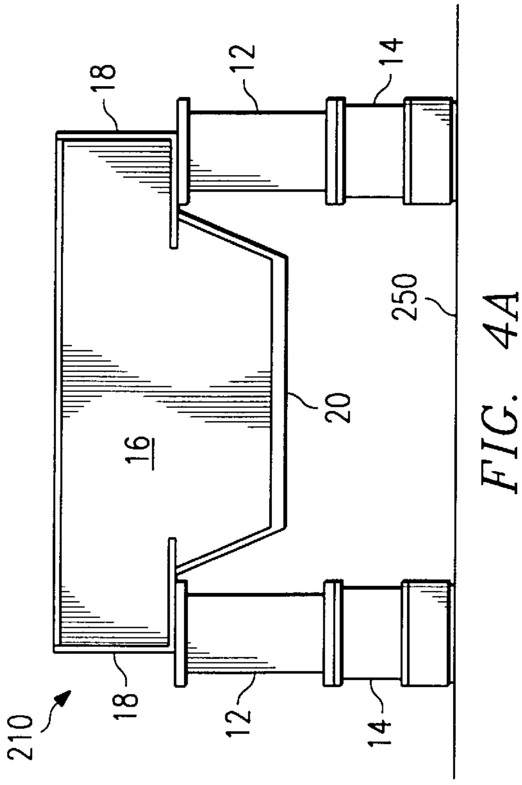

FIGS. 4*a*–4*d* are left-hand views of partially constructed bridge press 110 constructed according to the teachings of the present invention. FIG. 4*a* shows bridge press 110 after a first intermediate assembly 210 has been constructed. First intermediate assembly 210 comprises press beds 116 and 216*a*–216*c* disposed outwardly from first pair of horizontal beams 112. First intermediate assembly 210 may further comprise footings 114 coupled to and supporting first pair of horizontal beams 112.

First intermediate assembly 210 may be formed by aligning press bed 116 and 216*a*–216*c* so that wing-portions 118 rest outwardly from first pair of horizontal beams 112, and center portions 120 reside between first pair of horizontal beams 112. Press beds 116 and 216*a*–216*c* are coupled to first pair of horizontal beams 112 using tie rods (not explicitly shown) or other suitable fasteners. Where vertical support structures 122 will ultimately rest on press beds 116, 216*a* and 216*c,* cavities (not explicitly shown) in these press beds and first pair of horizontal beams 112 may be aligned to facilitate later insertion of tie rods 126. Press beds 116 and 216*a*–216*c* are wired and piped prior to, or just after their addition to first intermediate assembly 210. In addition, adjacent ends of press beds 216*a*–216*c* may be coupled together at this point (although press beds 216*a*–216*c* are not coupled together in this embodiment).

Although not explicitly shown, first intermediate assembly 210 may also include bolsters 162 and 262*a*–262*c*. Bolsters 262*a*–262*c* may be constructed at floor level 250 by coupling wheels 265 to support members 263, assembling drive mechanism 264*b,* and adding feed rail supports 266. In addition, lower dies may be coupled to support members 263. Also at floor level 250, the adjacent ends of bolsters 262*a*–262*c* may be coupled together using releasable fasteners 269. Pre-assembling bolsters 262*a*–262*c* in this manner saves significant pit assembly time, and, therefore, overall assembly time. Once constructed, bolsters 162 and 262*a*–262*c* are positioned between press beds 116 and 216*a*–216*c,* and slides 130 and 131, respectively.

The entire first intermediate assembly 210 may be assembled at a floor level 250, without first being placed in a pit 50 (see FIG. 4*c*). This provides a significant advantage of facilitating assembly of large portions of bridge press 10 outside of pit 50, which greatly reduces the total assembly time of bridge press 10.

Figure 4B:
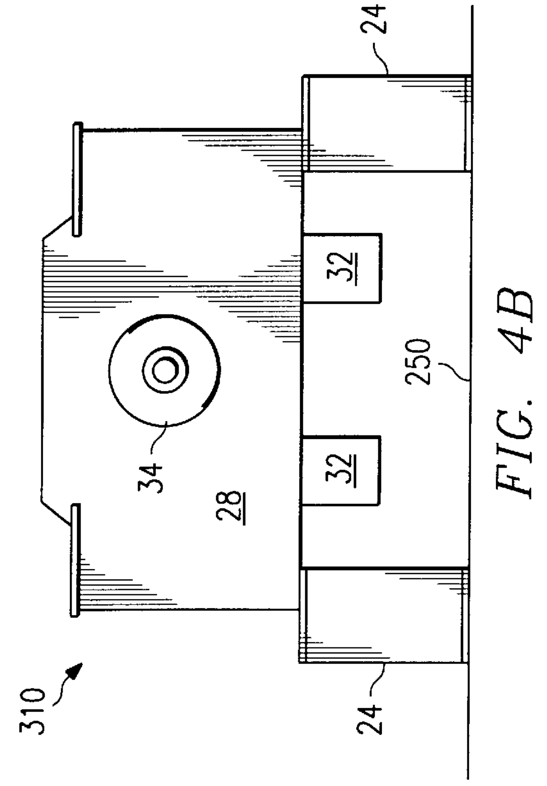

FIG. 4*b* shows a portion of bridge press 10 after a second intermediate assembly 310 has been constructed. Second intermediate assembly 310 comprises crowns 128 disposed outwardly from second pair of horizontal beams 124. The cavities (not explicitly shown) in crown 128 and second pair of horizontal beams 124 may be aligned to facilitate later insertion of tie rods 126. Tie rods and fasteners (not explicitly shown) may be used to attach crowns 128 to second pair of horizontal beams 124. Like first intermediate assembly 210, second intermediate assembly 310 may be completely assembled at a floor level 250. Crown 128 may be piped and wired, and link drives 136 linking crowns 128 may be connected prior to insertion of second intermediate assembly into pit 150. Again, this saves considerable pit time in assembling bridge press 110, which greatly reduces the total assembly time for bridge press 110.

FIG. 4*c* shows partially completed bridge press 110 after first intermediate assembly 210 has been placed into pit 150, and vertical support structures 122 have been added. First intermediate assembly 210 may be placed into pit 150 using a crane, hoist, or other appropriate device. Prior to integrating vertical support structures 122 into bridge press 110, vertical support structures 122 may be assembled at floor level 250. In assembling vertical support structures 122, vertical columns 123 may be piped and wired, and tie rods 126 may be inserted through cavities in vertical support columns 123. Once first intermediate assembly 210 has been placed into pit 50 and vertical support structures 122 have been assembled, vertical support structures 22 may be integrated by feeding tie rods 126 through cavities in press beds 116, 216*a,* and 216*c,* and first pair of horizontal beams 112. Where vertical support structures rest directly on first pair of horizontal beams 112 and between the press beds, vertical support structures 122 are integrated by feeding tie rods 126 are through cavities in first pair of horizontal beams 112. Fasteners 127 may be affixed to the lower ends of tie rods 126.

Figure 4D:
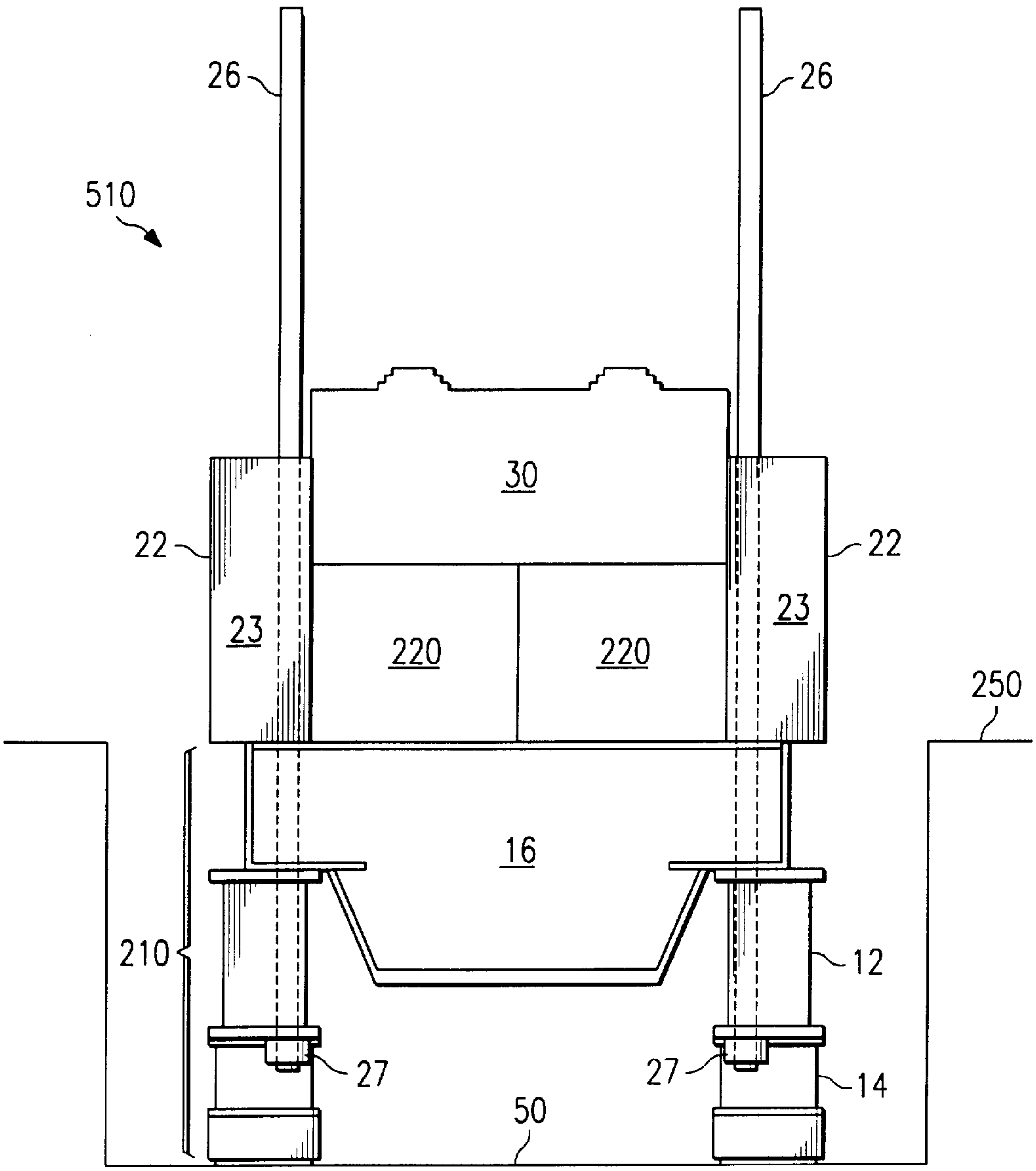

FIG. 4*d* shows partially completed bridge press 110 after the addition of spacers 220 and slides 130. Spacers 220 may be disposed outwardly from top side 115 of press beds 116 and 216*a*–216*c*. Next, slides 130 and 131 may be placed outwardly from spacers 220. Spacers 220 may comprise any devices or objects suitable to position slides 130 and 131 in a location to facilitate connection to crowns 128 and 129*a*–129*b,* respectively. Note that if the lower dies have already been coupled to bolsters 162 and 262*a*–262*c* (not explicitly shown), spacers 220 could be formed to reside adjacent to the lower dies. Although the illustrated embodiment shows vertical support structures 122 being added to bridge press 110 prior to the addition of spacers 220 and slides 130 and 131, it should be noted that the order of these steps could be switched without departing from the scope of the invention.

Figure 4E:
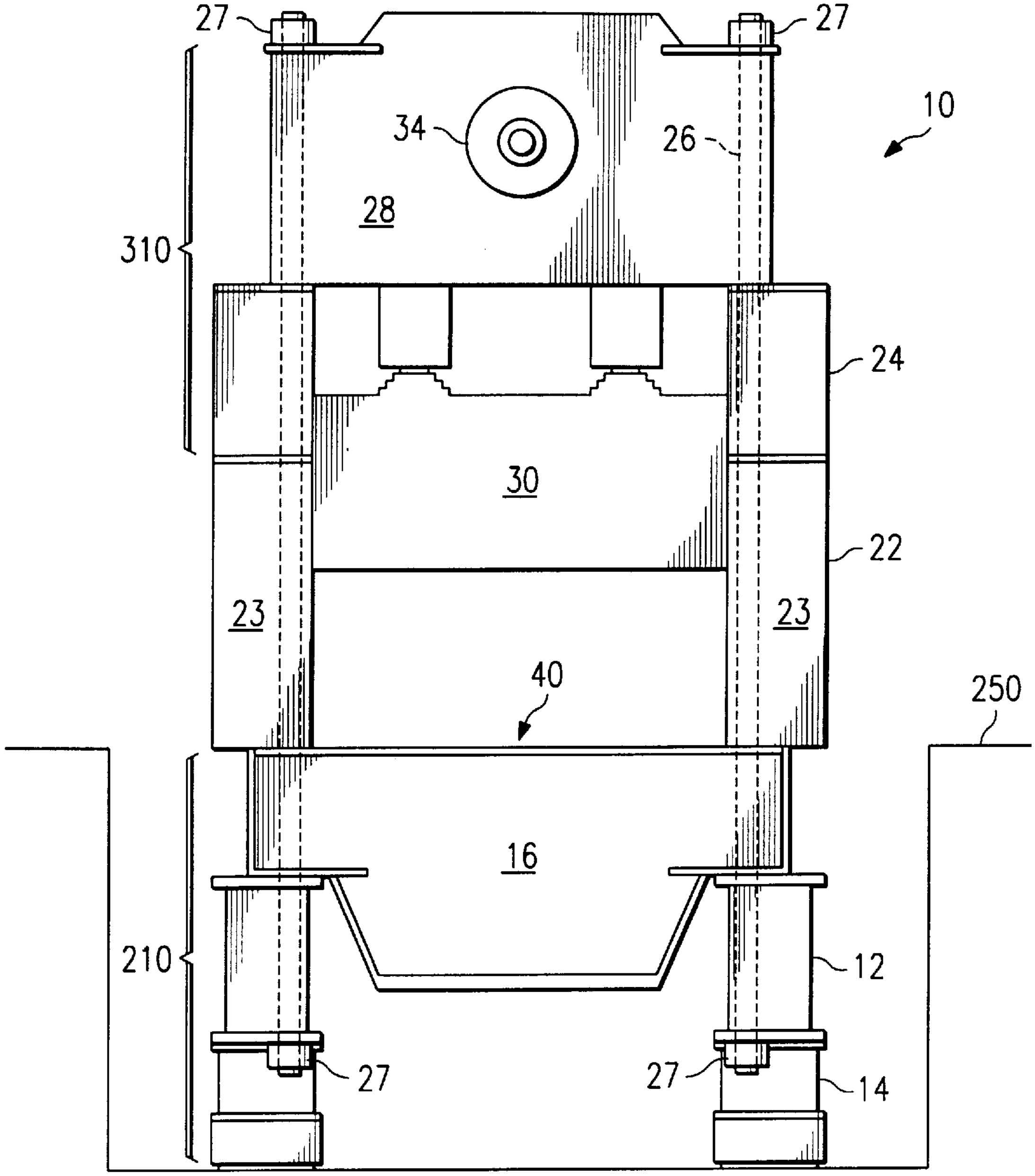
FIG. 4*e* is a left-hand view of a bridge press constructed according to the teachings of the present invention.

FIG. 4*e* shows bridge press 110 after second intermediate assembly 310 has been integrated into bridge press 110 and spacers 220 have been removed. Second intermediate assembly 310 may be coupled to first intermediate assembly 210 by feeding tie rods 126 through cavities in second pair of horizontal beams 124 and crowns 28, so that crown 128 aligns vertically with a slide 130 and a press bed 116, and so that crowns 129*a*–129*b* straddle slide 131 and press beds 216*a*–216*c*. Fasteners 127 may be affixed to the upper ends of tie rods 126 outwardly from crowns 128 and 129*a*–129*b.* Crowns 128 and 129*a*–129*b* may then be coupled to slides 130 and 131 via coupling members 32. Once each slide 130–131 has been coupled to its associated crown(s) 128 and 129*a*–129*b,* spacers 220 may be removed to create work stations 140 and 141*a*–141*c*.

The previous description is only one example of a method for assembling bridge press 110. Various steps can be modified, and their order changed, without departing from the scope of the invention.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A bolster assembly operable to carry a first set of dies used in a transfer press and to facilitate exchanging the first set of dies with a second set of dies, the bolster assembly comprising:

a plurality of adjacent support members releasably coupled to one another each operable to carry a respective die, the dies carried by the plurality of adjacent support members collectively comprising the first set of press dies;

a plurality of wheels disposed inwardly from at least one of the support members;

a drive mechanism coupled to at least one, but not all of the wheels, the drive mechanism operable to drive the wheel coupled thereto to facilitate exchanging the first set of dies with a second set of dies.

2. The bolster assembly of claim 1, wherein the plurality of bolsters comprise:

a first outer bolster;

a middle bolster having a first end releasably coupled the first outer bolster; and a second outer bolster releasably coupled to a second end of the middle bolster.

3. The bolster assembly of claim 2, wherein each bolster comprises a plurality of wheels disposed inwardly from at least one of the support members.

4. The bolster assembly of claim 3, wherein each bolster comprises four wheels disposed inwardly from at least one of the support members.

5. The bolster assembly of claim 3, wherein the drive mechanism is coupled only to the wheels disposed inwardly from the support member of the middle bolster.

6. The bolster assembly of claim 1, further comprising a feed rail support member coupled to the support member of at least one of the plurality of bolsters.

7. A method of forming a work piece using a transfer press having a bolster assembly operable to carry a first set of dies and to facilitate exchanging the first set of dies with a second set of dies, the bolster assembly comprising:

a plurality of adjacent support members releasably coupled to one another each operable to carry a respective die, the dies carried by the plurality of adjacent support members collectively comprising the first set of press dies;

a plurality of wheels disposed inwardly from at least one of the support members;

a drive mechanism coupled to at least one, but not all of the wheels, the drive mechanism operable to drive the wheel coupled thereto to facilitate exchanging the first set of dies with a second set of dies.

8. The method of claim 7, wherein the plurality of bolsters comprise:

a first outer bolster;

a middle bolster having a first end releasably coupled the first outer bolster; and a second outer bolster releasably coupled to a second end of the middle bolster.

9. The method of claim 8, wherein each bolster comprises a plurality of wheels disposed inwardly from at least one of the support members.

10. The method of claim 9, wherein each bolster comprises four wheels disposed inwardly from at least one of the support members.

11. The method of claim 9, wherein the drive mechanism is coupled only to the wheels disposed inwardly from the support member of the middle bolster.

12. The method of claim 7, further comprising a feed rail support member coupled to the support member of at least one of the plurality of bolsters.

* * * * *